United States Patent
Wang et al.

(10) Patent No.: US 11,532,121 B2
(45) Date of Patent: Dec. 20, 2022

(54) METHOD FOR MEASURING A SEAM ON AIRCRAFT SKIN BASED ON LARGE-SCALE POINT CLOUD

(71) Applicant: Nanjing University of Aeronautics and Astronautics, Jiangsu (CN)

(72) Inventors: Jun Wang, Jiangsu (CN); Kun Long, Jiangsu (CN); Qian Xie, Jiangsu (CN); Dening Lu, Jiangsu (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 32 days.

(21) Appl. No.: 17/169,527

(22) Filed: Feb. 7, 2021

(65) Prior Publication Data
US 2022/0122317 A1   Apr. 21, 2022

(51) Int. Cl.
G06K 9/00 (2022.01)
G06T 17/00 (2006.01)
G06V 20/00 (2022.01)

(52) U.S. Cl.
CPC ............... *G06T 17/00* (2013.01); *G06V 20/00* (2022.01); *G06T 2207/10028* (2013.01); *G06T 2207/30252* (2013.01)

(58) Field of Classification Search
CPC ........... G06T 17/00; G06T 2207/10028; G06T 2207/30252; G06T 7/0002; G06T 7/12; G06T 7/13; G06T 2207/30168; G06V 20/00; G01B 11/14; G06K 9/6223
See application file for complete search history.

(56) References Cited

U.S. PATENT DOCUMENTS 9,137,462 B2 * 9/2015 Li .......................... G06T 7/0004
2016/0378895 A1   12/2016 Gnecco et al.

FOREIGN PATENT DOCUMENTS

| CN | 101825440 A | 9/2010 |
| CN | 107687816 A | 2/2018 |
| CN | 108510516 A | 9/2018 |
| CN | 109596059 A | 4/2019 |

(Continued)

OTHER PUBLICATIONS

Mosca, Nicola, et al. "A RANSAC-based method for detecting post-assembly defects in aircraft interiors." 2020 IEEE 7th International Workshop on Metrology for AeroSpace (MetroAeroSpace). IEEE, 2020. https://ieeexplore.ieee.org/abstract/document/9160295 (Year: 2020).*

(Continued)

*Primary Examiner* — Claire X Wang
*Assistant Examiner* — Han Hoang

(57) ABSTRACT

A method for measuring a seam on aircraft skin based on a large-scale point cloud is disclosed. A point cloud density of each point in an aircraft skin point cloud is calculated. Seam and non-seam point clouds are divided according to a discrepancy of the calculated point cloud density. A point is selected from the point cloud of the seam area, and a section at the point is extracted. A certain range of the seam and non-seam point clouds is projected to the section and a projected point cloud is acquired. A calculation model of flush and gap is constructed, and the flush and the gap of the aircraft skin seam at the measuring point is calculated according to the projected point cloud and the calculation model.

7 Claims, 4 Drawing Sheets

(56) References Cited

FOREIGN PATENT DOCUMENTS

| | | |
|---|---|---|
| CN | 111028221 A | 4/2020 |
| CN | 111524129 A | 8/2020 |
| CN | 111737822 A | 10/2020 |

OTHER PUBLICATIONS

Kosmopoulos, Dimitrios, and Theodora Varvarigou. "Automated inspection of gaps on the automobile production line through stereo vision and specular reflection." Computers in Industry 46.1 (2001): 49-63. https://www.sciencedirect.com/science/article/pii/S0166361501001130 (Year: 2001).*

Minnetti, Elisa, et al. "A smartphone integrated hand-held gap and flush measurement system for in line quality control of car body assembly." Sensors 20.11 (2020): 3300.https://www.proquest.com/openview/3d4ae7fb34be3decd104ca2d42dec1a0/1.pdf?pq-origsite=gscholar&cbl=2032333 (Year: 2020).*

Tran, Thi-Trang, and CheolKeun Ha. "Non-contact gap and flush measurement using monocular structured multi-line light vision for vehicle assembly." International Journal of Control, Automation and Systems 16.5 (2018): 2432-2445. https://link.springer.com/article/10.1007/s12555-017-0535-y (Year: 2018).*

Zhang Bo, Li Shuanggao, Hao Long and Zhu Kui; Extraction Method of Gap and Flush of Three-Dimensional Seam Point Clouds Based on SVM; Aeronautical Manufacturing Technology, 2020, 63(7); College of Mechanical and Electrical Engineering, Nanjing University of Aeronautics & Astronautics.

Zhang Hongyao, Li Lun, Zhao Jinbin, Chen Songlin; Research on Measurement Technique of Flush and Gap between Aircraft Skins Based on Robot-3D Laser Scanner System; Tool Engineering, vol. 52, No. 8, 2018; University of Chinese Academy of Sciences.

Dening Lu, Xuequan Lu, Yangxing Sun, Jun Wang; Deep feature-preserving normal estimation for point cloud filtering; Computer-Aided Design 126(5): 102850, May 2020; Nanjing University of Aeronautics and Astronautics, PR China.

* cited by examiner

US 11,532,121 B2

METHOD FOR MEASURING A SEAM ON AIRCRAFT SKIN BASED ON LARGE-SCALE POINT CLOUD

CROSS-REFERENCE TO RELATED APPLICATIONS

This application claims the benefit of priority from Chinese Patent Application No. 202011102350.0, filed on Oct. 15, 2020. The content of the aforementioned application, including any intervening amendments thereto, is incorporated herein by reference in its entirety.

TECHNICAL FIELD

This application relates to flush measurements of aircraft skin, and more particularly to a method for measuring a seam on aircraft skin based on a large-scale point cloud.

BACKGROUND

With the rapid development of aerospace industry, many breakthroughs have been made in aircraft research and manufacturing. As one of the key components of the aircraft, the skin is riveted to the internal skeleton of the aircraft through rivets. The assembly quality of the skin affects the reliability of the aerodynamic shape of the aircraft. The gap width and flush of the seam at the joint of the aircraft skin are one of the important indicators for evaluating the assembly quality of the skin.

Conventionally, the skin seam measurement is carried out using a feeler gauge. This method has high requirements in manual operations, and has large errors, low efficiency and low repeatability. In recent years, 3D laser scanning measurement technology has been developed and unproved, and has been used as the mainstream measurement technology in various fields due to its fast speed, high accuracy, and strong adaptability.

SUMMARY

To overcome the above-mentioned defects in the prior art, the present disclosure provides a method for measuring a seam on aircraft skin based on a large-scale point cloud. A three-dimensional laser scanning technology is used for a flush measurement of an aircraft skin seam, so to improve the efficiency and accuracy of the flush measurement of the seam.

The technical solutions of the present disclosure are described as follows.

A method for measuring a seam on aircraft skin based on a large-scale point cloud, comprising 1) calculating a point cloud density of each point in an aircraft skin point cloud;

2) dividing seam and non-seam point clouds according to a discrepancy of the calculated point cloud density;

3) selecting a measuring point from the point cloud of the seam area; extracting a section at the point; projecting a certain range of the seam and non-seam point clouds to the section; acquiring a projected point cloud; and 4) constructing a calculation model of flush and gap; and calculating the flush and the gap of the aircraft skin seam at the selected measuring point according to the projected point cloud and the calculation model.

In some embodiments, the step (1) comprises:

11) based on the aircraft skin point cloud P, constructing an Axis-Aligned Bounding Box (AABB) of the point cloud; estimating an average area of a point; and calculating a side length of a kernel; and 12) selecting any point $p_i$ from the point cloud; constructing a bounding sphere $O_i$ using the kernel as a radius; counting the number of points in the bounding sphere and taking the number of points in the bounding sphere as a density $d_i$ around the point $p_i$.

In some embodiments, the step (11) comprises:

calculating a volume of the AABB of the point cloud; calculating a side length of a cube corresponding to the volume of the AABB; calculating an area of a bottom surface according to the side length; and calculating an average area occupied by each point on the bottom surface according to the area of the bottom surface; constructing the kernel with k points; and calculating the side length of the kernel:

$$\text{kernel} = \sqrt{\frac{(\sqrt[3]{V})^2}{N} \times k}, \tag{1}$$

wherein V is a volume of the AABB of the aircraft skin point cloud P; N is the number of points in the aircraft skin point cloud P; and k is a constant representing the number of points constituting the kernel.

In some embodiments, the step (2) comprises:

21) based on the calculated point cloud density, standardizing the point cloud density to [0,1]; and 22) taking 0 and 1 as two initial centers respectively, dividing a point cloud $P^S$ of a seam area and a point cloud $P^{NS}$ of a non-seam area based on the standardized point cloud density using a k-means clustering algorithm.

In some embodiments, in step (21), based on the calculated point cloud density, the point cloud density is standardized to [0, 1]:

$$d'_i = \frac{d_i}{d_{max} - d_{min}}, \tag{2}$$

wherein $d_{max}$ is a maximum density of a point in the point cloud P, and $d_{min}$ is a minimum density of a point in the point cloud P.

In some embodiments, the step (3) comprises:

31) selecting a point p from the point cloud $P^S$ of the seam area; constructing a bounding sphere with the point p as a center and R as a radius; in the bounding sphere, taking a point cloud $P_R^S$ of the seam area and a point cloud $P_R^{NS}$ of the non-seam area in the bounding sphere together to constitute a R-neighborhood point cloud of the point p; dividing the point cloud $P_R^S$ in the R-neighborhood seam area and the point cloud $P_R^{NS}$ in the R-neighborhood non-seam area into two pails respectively by Euclidean clustering, so as to obtain $P_{IR}^S$, $P_{oR}^S$, $P_{IR}^{NS}$, $P_{oR}^{NS}$;

32) calculating normal vectors of each point in the point cloud $P_R^{NS}$ of the R-neighborhood non-seam area at the same side of the point p, so as to form a normal vector set $\vec{N}$; taking an average of the normal vectors in the point cloud of the R-neighborhood non-seam area at the side of the point as a normal vector of a local surface at the side of the point p:

$$\vec{n}_S = \frac{1}{|\vec{N}|} \sum_{\vec{n}_i \in \vec{N}} \vec{n}_i; \qquad (3)$$

33) searching a point $p_j$ in the point cloud $P_{IR}^S$ of the R-neighboring seam area at the same side of the point p that is closest to each point $q_j$ in the point cloud $P_{oR}^S$ of the R-neighboring seam area at the opposite side of the point p; constructing a direction vector $\vec{\tau}_j = q_j - p_j (\vec{\tau}_j \in \vec{T})$ according to each pair of the points; performing Gaussian clustering on all direction vectors $\vec{T}$; and taking an average $$\vec{\tau} = \frac{1}{|\vec{C}|} \sum_{\vec{\tau}_k \in \vec{C}} \vec{\tau}_k$$

of direction vectors in a largest cluster $\vec{C}$ in a Gaussian clustering result as a direction vector that is perpendicular to a local seam direction at the point;

34) based on the normal vector ifs of the local surface at the point p and the direction vector $\vec{\tau}_k$, determining a normal vector of a section r at the point p using a right-hand rule:

$$\vec{n}_c = \vec{n}_s - \vec{\tau}_k \qquad (4); \text{ and}$$

35) projecting the points of the seam area and the non-seam area which are within a certain range from the section Γ on the section, and extracting projected points $Q^S$ of the seam area and projected points $Q^{NS}$ of the non-seam area, respectively:

$$q' = p + \vec{pq} \times \vec{n}_c \qquad (5),$$

wherein q is a point to be projected, and q' is a point where the q is projected onto the section Γ.

In some embodiments, the step (4) comprises:

41) dividing the projected points $Q^S$ of the seam area and the projected points $Q^{NS}$ of the non-seam area respectively through Euclidean clustering, so as to obtain projected points $Q_l^S$, $Q_o^S$, $Q_l^{NS}$, $Q_o^{NS}$ of both sides;

42) based on the projected points $Q_l^{NS}$ ($Q_o^{NS}$) of a side of the non-seam area, fitting a straight line $L_l(L_o)$ using a random sample consensus (RANSAC) straight line fitting algorithm; and based on the projected points $Q_l^S(Q_o^S)$ of a side of in the seam area, fitting a circle $C_l(C_o)$ using a RANSAC circle fitting algorithm;

43) calculating intersections of the fitting straight line $L_l(L_o)$ and the fitting circle $C_l(C_o)$; and taking a point in inliers of the fitting circle that is farthest from the critical point $p^c$ as a boundary point $p^b = \text{argmax } d(c_i)$ wherein $d(c_i) = |c_i - p^c|$, $c_i \in C_l(C_o)$;

44) according to the boundary point $p_l^b(p_o^b)$ and the fitting straight line $L_l(L_o)$ at a same side, constructing an auxiliary line $L_{A_l}(L_{A_o})$ that is perpendicular to the fitting straight line $L_l(L_o)$ at the same side; wherein a direction vector of the auxiliary line is:

$$\vec{\tau}_{A_{l/o}} = \vec{n}_s \times \vec{\tau}_{l/o} \qquad (6),$$

wherein $\vec{n}_s$ is a normal vector of the section and $\vec{\tau}_{l/o}$ is a direction vector of the fitting straight line $L_l(L_o)$ at the same side; and 45) taking a distance from a critical point $p_l^c(p_o^c)$ at a side to a fitting straight line $L_o(L_l)$ at an opposite side as a flush; taking a distance from the boundary point $p_l^b(p_o^b)$ at a side to an auxiliary line $L_{A_o}(L_{A_l})$ at an opposite side as a single-side gap width:

$$\text{flush}_A = \left| \overrightarrow{p_l^i p_o^c} \times \vec{\tau}_l \right|; \qquad (7)$$

$$\text{flush}_B = \left| \overrightarrow{p_o^i p_i^c} \times \vec{\tau}_o \right|; \qquad (8)$$

$$\text{gap}_A = \left| \overrightarrow{p_l^b p_o^b} \times \vec{\tau}_{A_l} \right|; \qquad (9)$$

$$\text{gap}_B = \left| \overrightarrow{p_o^b p_l^b} \times \vec{\tau}_{A_o} \right|; \qquad (10)$$

taking an average of the flushes at both sides as the flush of the seam at the point; and taking an average of the gap width at both sides as the seam width at the point:

$$\text{flush} = \frac{\text{flush}_A + \text{flush}_B}{2}; \qquad (11)$$

$$\text{gap} = \frac{\text{gap}_A + \text{gap}_B}{2}. \qquad (12)$$

In some embodiments, the calculating the intersections of the fitting straight line $L_l(L_o)$ and the fitting circle $C_l(C_o)$ as a critical point in step (4) comprises:

if there are two intersections $I_1$, $I_2$, taking the intersection closest to a point in the fitting circle as the critical point $p^c = \text{argmin}\{d_1(c_i), d_2(c_i)\}$, wherein $d_1(i) = |c_i - I_1|$, $d_1(i) = |c_i - I_2|$, $c_i \in C_l(C_o)$;

if there is only an intersection I, taking the intersection as the critical point $p^c = I$; and if there is no intersection, taking a point in the fitting circle that is closest to the fitting straight line as the critical point:

$p^c = \text{argmax } d_L(c_i)$, wherein $d_L(c_i) = |\overrightarrow{p_{l/o} c_i} \times \vec{\tau}_{l/o}|$, $c_i \in C_l(C_o)$; $p_{l/o}$ and $p_{l/o}$ are defining parameters of the fitting straight line $L_l(L_o)$ of one side.

The beneficial effects of the present disclosure are described as follows.

This disclosure solves the problem of low degree of automation in measuring a seam on aircraft skin, realizing an automatic measurement of aircraft skin. The method of the present disclosure has high degree of automation, high measurement accuracy, and is easy to carry out.

A mathematical model based on a three-dimensional point cloud data of the aircraft skin seam is constructed to calculate a flush and a gap of the seam, so as to evaluate an assembly quality of the aircraft skin.

DETAILED DESCRIPTION OF EMBODIMENTS

The embodiments of the present disclosure will be further described clearly with reference to the accompanying drawings.

Figure 1:
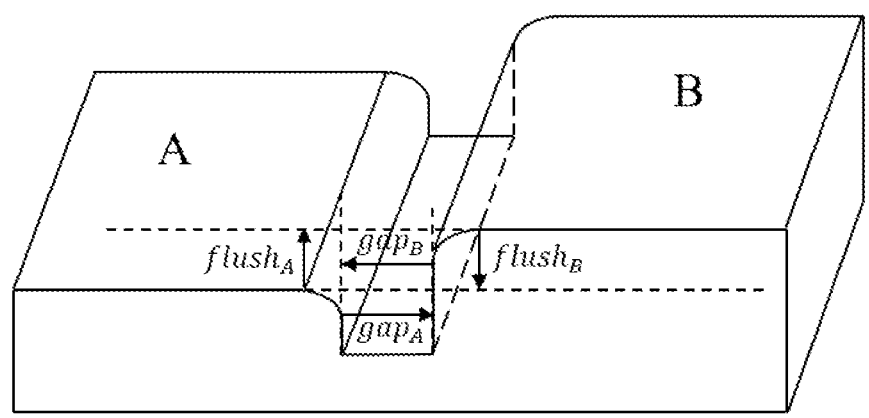
FIG. 1 is a model of an aircraft skin seam in accordance with an embodiment of the present disclosure.
Figure 2:
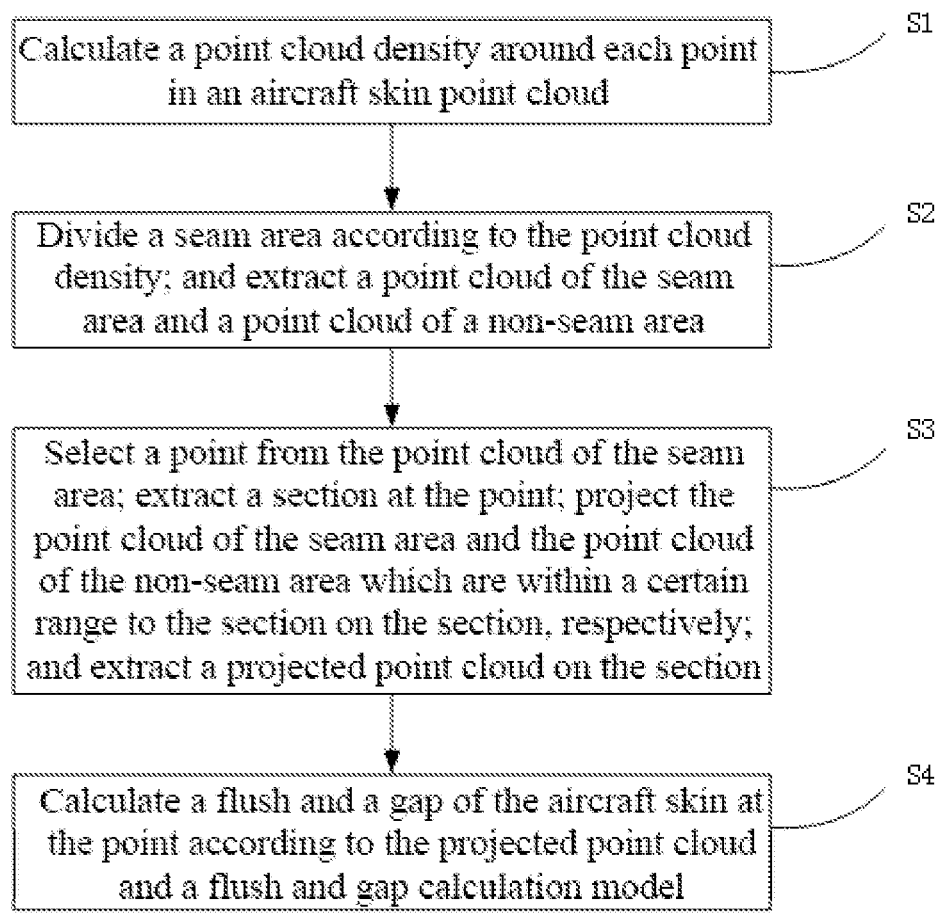
FIG. 2 is a flowchart of an algorithm for calculating a flush and a gap of an aircraft skin based on a point cloud in accordance with an embodiment of the present disclosure.

In the prior art, the flush and gap of the aircraft skins are hard to be automatically measured. To solve this problem, the present disclosure provides a method for measuring a seam on aircraft skin based on a large-scale point cloud. FIG. 1 is a structure of an aircraft skin model in accordance with the present disclosure. FIG. 2 is a flowchart of an algorithm in accordance with the present disclosure. As shown in FIG. 2, the method includes the following steps.

1) A point cloud density of each point in an aircraft skin point cloud is calculated.

2) Seam and non-seam point clouds are divided according to a discrepancy of the calculated point cloud density.

3) A measuring point is selected from the point cloud of the seam area, and a section at the point is extracted. A certain range of the seam and non-seam point clouds is projected to the section. A projected point cloud is acquired.

4) A calculation model of flush and gap is constructed, and the flush and gap of the aircraft skin seam at the measuring point is calculated according to the projected point cloud and the calculation model.

Figure 3:
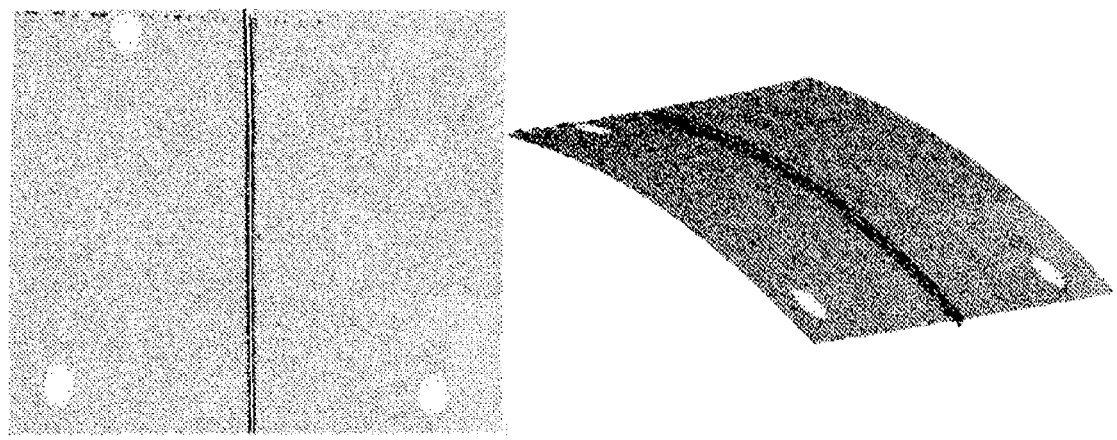
FIG. 3 is a point cloud of an aircraft skin obtained by means of a three-dimensional scanner in accordance with an embodiment of the present disclosure.

The technical solutions of the present disclosure can realize an automatic measurement of the aircraft skin. A mathematical model of the aircraft skin seam is established based on a three-dimensional point cloud to calculate the seam flush and gap, so as to evaluate an assembly quality of the aircraft skin. The method of the present disclosure has a high degree of automation and a high measurement accuracy. FIG. 3 is a point cloud of the aircraft skin obtained by means of a three-dimensional scanner. As shown in FIG. 3, the seam area can be clearly distinguished according to a distribution of the point cloud density.

In one embodiment, the step (1) includes following steps.

11) Based on the aircraft skin point cloud P, an Axis-Aligned Bounding Box (AABB) of the point cloud is constructed, so as to estimate an average area of a point and calculate a side length of a kernel:

$$\text{kernel} = \sqrt{\frac{(\sqrt[3]{V})^2}{N} \times k}, \quad (1)$$

where V is a volume of the AABB of the aircraft skin point cloud P; N is the number of points in the aircraft skin point cloud P; and k is a constant representing the number of points constituting the kernel, usually k=12.

12) A point $p_i$ is selected from the point cloud. A bounding sphere $O_i$ is constructed using the kernel as a radius. The number of points in the bounding sphere is counted and used as a density $d_i$ around the point $p_i$.

In one embodiment, the step (2) includes following steps.

21) Based on the calculated point cloud density, the point cloud density is standardized to [0, 1]:

$$d'_i = \frac{d_i}{d_{max} - d_{min}}, \quad (2)$$

where $d_{max}$ is a maximum density in the point cloud P, and $d_{min}$ is a minimum density in the point cloud P.

Figure 4:
FIG. 4 shows a result of extracting a point cloud of a seam area in accordance with an embodiment of the present disclosure.

22) With 0 and 1 as two initial centers respectively, a point cloud $P^S$ of a seam area and a point cloud $P^{NS}$ of a non-seam area are divided based on the standardized point cloud density using a k-means (k=2) clustering algorithm, and a dividing result of the point cloud in the gap area is shown in FIG. 4.

In one embodiment, the step (3) includes:

31) A point p is selected from the point cloud $P^S$ of the seam area, and a bounding sphere is constructed with the point p as a center and R as a radius. In the bounding sphere, a point cloud $P_R^S$ of the seam area and a point cloud $P_R^{NS}$ of the non-seam area in the bounding sphere together constitute a R-neighborhood point cloud of the point p. The point cloud $P_R^S$ in the R-neighborhood seam area and the point cloud $p_R^{NS}$ in the R-neighborhood non-seam area are divided into two parts respectively by Euclidean clustering, so as to obtain $P_{iR}^S$, $P_{oR}^S$, $P_{iR}^{NS}$, $P_{oR}^{NS}$.

32) Normal vectors of each point in the point cloud $P_R^{NS}$ of the R-neighborhood non-seam area at a same side of the point p are calculated, so as to form a normal vector set $\vec{N}$. An average of the normal vectors in the point cloud of the R-neighborhood non-seam area at the side of the point is calculated to be used as a normal vector of a local surface at the side of the point p:

$$\vec{n}_S = \frac{1}{|\vec{N}|} \sum_{\vec{n}_i \in \vec{N}} \vec{n}_i. \quad (3)$$

33) Each point $p_j$ in the point cloud $P_{iR}^S$ of the R-neighboring seam area at the same side of the point p that is closest to each point $q_j$ in the point cloud $P_{oR}^S$ of the R-neighboring seam area at the opposite side of the point p is searched. A direction vector is constructed $\vec{\tau}_j = q_j - p_j (\vec{\tau}_j \in \vec{T})$ according to each pair of the points. Gaussian clustering is performed on all direction vectors $\vec{T}$, and an average $$\vec{\tau} = \frac{1}{|\vec{C}|} \sum_{\vec{\tau}_k \in \vec{C}} \vec{\tau}_k$$

of direction vectors in a largest cluster $\vec{C}$ in a Gaussian clustering result is taken as a direction vector that is perpendicular to a local seam direction at the point.

34) Based on the normal vector $\vec{n}_S$ of the local surface at the point p and the direction vector $\vec{\tau}_k$, a normal vector of a section $\Gamma$ at the point p is determined using a right-hand rule:

$$\vec{n}_c = \vec{n}_S \times \vec{\tau}_k \quad (4).$$

35) The points of the seam area and the non-seam area which are within a certain range from the section Γ are projected on the section, and projected points $Q^S$ of the seam area and projected points $Q^{NS}$ of the non-seam area are extracted, respectively:

$$q' = p + \vec{pq} \times \vec{n}_c \qquad (5),$$

where q is a point to be projected, and q' is a point where the q is projected onto the section Γ.

Figure 5:
FIG. 5 is a sectional projection view in accordance with an embodiment of the present disclosure.

FIG. 5 is a sectional projection view in accordance with an embodiment of the present disclosure.

Figure 6:
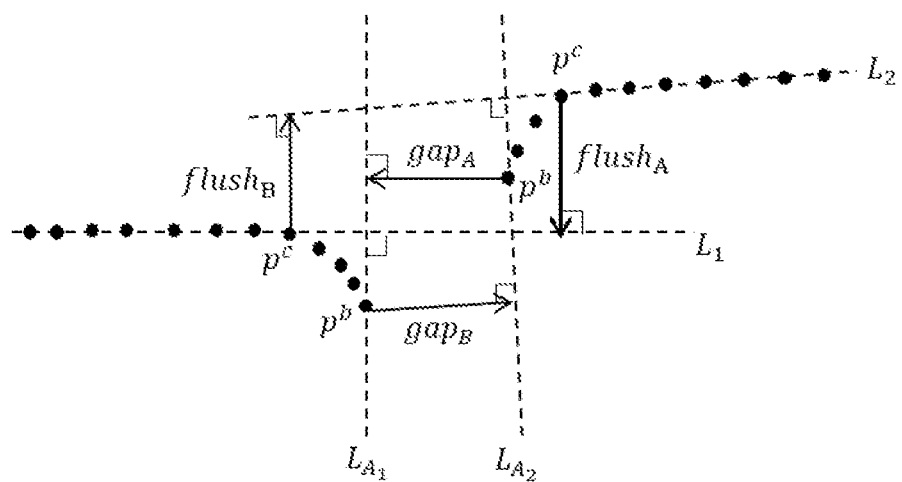
FIG. 6 is a calculation model of flush and gap based on a point cloud in accordance with an embodiment of the present disclosure.

FIG. 6 is a calculation model of flush and gap in an embodiment. The calculation model of flush and gap is defined by two pairs of characteristic points $p^c$, $p^b$ distributed at both sides of the gap, and two pairs of straight lines $L_1L_2$, $L_{A_1}L_{A_2}$. Where $p^c$ is a critical point of one side of the gap area; and $p^b$ is a boundary point of one side of the gap area; $L_1$, $L_2$ are fitting straight lines of one side of a surface of a gap; $L_{A_1}$, $L_{A_2}$ are auxiliary straight lines that pass through the boundary points at a same side and are perpendicular to the fitting straight line of the surface. The flush is defined as an average of two single-side flushes, where the single-side flush is defined as a distance from a critical point of one side to a fitting straight line of an opposite side of a surface of a gap. The gap is defined as an average of two single-side gaps, where the single-side gap is defined as a distance from a boundary point at a side to a straight line at an opposite side.

In one embodiment, in step (4), the calculation model (FIG. 6) of flush and gap is constructed, and the flush and gap of the aircraft skin at the point is calculated according to the projected point cloud and the model. The step (4) includes following steps.

41) The projected points $Q^S$ of the seam area and the projected points $Q^{NS}$ of the non-seam area are divided respectively through Euclidean clustering, so as to obtain projected points $Q_l^S$, $Q_o^S$, $Q_l^{NS}$, $Q_o^{NS}$ of both sides;

42) Based on the projected points $Q_l^{NS}$ ($Q_o^{NS}$) of a side of the non-seam area, a straight line $L_l(L_o)$ is fitted using a random sample consensus (RANSAC) straight line fitting algorithm. Based on the projected points $Q_l^S(Q_o^S)$ of a side of in the seam area, a circle $C_l(C_o)$ is fitted using a RANSAC circle fitting algorithm;

43) Intersections of the fitting straight line $L_l(L_o)$ and inliers of the fitting circle $C_l(C_o)$ at a same side is calculated.

If there are two intersections, the intersection closest to a point in the fitting circle is taken as a critical point $p^c = \mathrm{argmin}\{d_1(c_i), d_2(c_i)\}$, where $d_1(i) = |c_i - I_1|$, $d_1(i) = |c_i - I_2|$, $c_i \in C_l(C_o)$.

If there is only an intersection I, the intersection is taken as the critical point $p^c = I$.

If there is no intersection, a point in the fitting circle that is closest to the fitting straight line is taken as the critical point $p^c = \mathrm{argmax}\ d_L(c_i)$, where $d_L(c_i) = |\vec{p_{I/o}c_i} \times \vec{\tau}_{I/o}|$, $c_i \in C_l$ ($C_o$), $p_{I/o}$ and $p_{I/o}$ are defining parameters of the fitting straight line $L_l(L_o)$ of one side.

A point in the fitting circle that is farthest from the critical point $p^c$ is calculated and taken as a boundary point $p^b = \mathrm{argmax}\ d(c_i)$, where $d(c_i) = |c_i - p^c|$, $c_i \in C_l(C_o)$.

44) According to the boundary point $p_l^b(p_o^b)$ and the fitting straight line $L_l(L_o)$ at a same side, an auxiliary line $L_{A_l}(L_{A_o})$ that is perpendicular to the fitting straight line $L_l(L_o)$ at the same side is constructed. A direction vector of the auxiliary line is:

$$\vec{\tau}_{A_{I/o}} = \vec{n}_s \times \vec{\tau}_{I/o} \qquad (6),$$

where $\vec{n}_s$ is a normal vector of the section and $\vec{\tau}_{I/o}$ is a direction vector of the fitting straight line $L_l(L_o)$ at the same side.

45) A distance from a critical point $p_l^c(p_o^c)$ at a side to a fitting straight line $L_o(L_l)$ at an opposite side is calculated and taken as a flush. A distance from the boundary point $p_l^b(p_o^b)$ at a side to an auxiliary line $L_{A_o}(L_{A_l})$ at an opposite side is calculated and taken as a single-side gap width:

$$\mathrm{flush}_A = \left|\vec{p_l^i p_o^c} \times \vec{\tau}_l\right|; \qquad (7)$$

$$\mathrm{flush}_B = \left|\vec{p_o^i p_l^c} \times \vec{\tau}_o\right|; \qquad (8)$$

$$\mathrm{gap}_A = \left|\vec{p_l^b p_o^b} \times \vec{\tau}_{A_l}\right|; \qquad (9)$$

$$\mathrm{gap}_B = \left|\vec{p_o^b p_l^b} \times \vec{\tau}_{A_o}\right|. \qquad (10)$$

An average of the flushes at both sides is taken as the flush of the seam at the measuring point, and an average of the gap width at both sides is taken as the seam width at the measuring point:

$$\mathrm{flush} = \frac{\mathrm{flush}_A + \mathrm{flush}_B}{2}; \qquad (11)$$

$$\mathrm{gap} = \frac{\mathrm{gap}_A + \mathrm{gap}_B}{2}. \qquad (12)$$

An automatic measurement algorithm of flush and gap based on a large-scale point cloud in the present disclosure is not limited to the flush and gap measurement of aircraft skin, but includes the flush and gap measurement of automobiles and ships. It should be noted that the present disclosure is not limited to the precise structure described in the description and the accompanying drawings, and various modifications and changes can be made without departing from the spirit of the present disclosure.

The above-mentioned are preferred embodiments of the present disclosure, and not intended to limit the protection scope of the present disclosure. Technical solutions without departing from the spirit of the present disclosure should fall within the protection scope of the appended claims. For those skilled in the art, any improvements and modifications without departing from the spirit of the present disclosure should fall within the protection scope of the appended claims.

What is claimed is:

1. A method for measuring a seam on aircraft skin based on a large-scale point cloud, comprising
   1) calculating a point cloud density of each point in an aircraft skin point cloud;
   2) dividing seam and non-seam point clouds according to a discrepancy of the calculated point cloud density;
   3) selecting a measuring point from the point cloud of the seam area; extracting a section at the point; projecting a certain range of the seam and non-seam point clouds to the section; acquiring a projected point cloud; and
   4) constructing a calculation model of flush and gap; and calculating the flush and the gap of the aircraft skin seam at the measuring point according to the projected point cloud and the calculation model, comprising:
      41) dividing the projected points $Q^S$ of the seam area and the projected points $Q^{NS}$ of the non-seam area respectively through Euclidean clustering, so as to obtain projected points $Q_I^S$, $Q_o^S$, $Q_I^{NS}$, $Q_o^{NS}$ of both sides;

42) based on the projected points $Q_I^{NS}$ ($Q_o^{NS}$) of a side of the non-seam area, fitting a straight line $L_I(L_o)$ using a random sample consensus (RANSAC) straight line fitting algorithm; and based on the projected points $Q_L^S(Q_o^S)$ of a side of in the seam area, fitting a circle $C_I(C_o)$ using a RANSAC circle fitting algorithm;

43) calculating intersections of the fitting straight line $L_I(L_o)$ and inliers of the fitting circle $C_I(C_o)$; and taking a point in the fitting circle that is farthest from the critical point $p^c$ as a boundary point $p^b = \text{argmax } d(c_i)$, wherein $d(c_i) = |c_i - p^c\uparrow|$, $c_i \in C_I(C_o)$ 44) according to the boundary point $p_I^b(p_o^b)$ and the fitting straight line $L_I(L_o)$ at a same side, constructing an auxiliary line $L_{A_I}(L_{A_o})$ that is perpendicular to the fitting straight line $L_I(L_o)$ at the same side; wherein a direction vector of the auxiliary line is:

$$\vec{\tau}_{A_{l/o}} = \vec{n}_s \times \vec{\tau}_{l/o} \quad (6),$$

wherein $\vec{n}_s$ is a normal vector of the section and $\vec{\tau}_{l/o}$ is a direction vector of the fitting straight line $L_I(L_o)$ at the same side; and 45) taking a distance from a critical point $p_I^c(p_o^c)$ at a side to a fitting straight line $L_o(L_I)$ at an opposite as a flush; taking a distance from the boundary point $p_I^b(p_o^b)$ at a side to an auxiliary line $L_{A_o}(L_{A_I})$ at an opposite side as a single-side gap width:

$$\text{flush}_A = \left| \vec{p_I^l p_o^c} \times \vec{\tau}_l \right|; \quad (7)$$

$$\text{flush}_B = \left| \vec{p_o^l p_I^c} \times \vec{\tau}_o \right|; \quad (8)$$

$$\text{gap}_A = \left| \vec{p_I^b p_o^b} \times \vec{\tau}_{A_l} \right|; \quad (9)$$

$$\text{gap}_B = \left| \vec{p_o^b p_I^b} \times \vec{\tau}_{A_o} \right|; \quad (10)$$

taking an average of the flushes at both sides as the flush of the seam at the measuring point and taking an average of the gap width at both sides as the seam width at the measuring point:

$$\text{flush} = \frac{\text{flush}_A + \text{flush}_B}{2}; \quad (11)$$

$$\text{gap} = \frac{\text{gap}_A + \text{gap}_B}{2}. \quad (12)$$

2. The method of claim 1, wherein the step (1) comprises:

11) based on the aircraft skin point cloud P, constructing an Axis-Aligned Bounding Box (AABB) of the point cloud; estimating an average area of a point; and calculating a side length of a kernel; and 12) selecting any point $p_i$ from the point cloud; constructing a bounding sphere $O_i$ using the kernel as a radius; counting the number of points in the bounding sphere and taking the number of points in the bounding sphere as a density $d_i$ around the point $P_i$.

3. The method of claim 2, wherein the step (11) comprises:

calculating a volume of the AABB of the point cloud; calculating a side length of a cube corresponding to the volume of the AABB; calculating an area of a bottom surface according to the side length; and calculating an average area occupied by each point on the bottom surface according to the area of the bottom surface; constructing the kernel with k points; and calculating the side length of the kernel:

$$\text{kernel} = \sqrt{\frac{(\sqrt[3]{V})^2}{N} \times k}, \quad (1)$$

wherein V is a volume of the AABB of the aircraft skin point cloud; N is the number of points in the aircraft skin point cloud; and k is a constant representing the number of points constituting the kernel.

4. The method of claim 1, wherein the step (2) comprises:

21) based on the calculated point cloud density, standardizing the point cloud density to [0, 1]; and 22) taking 0 and 1 as two initial centers respectively, dividing a point cloud $P^s$ of a seam area and a point cloud $P^{NS}$ of a non-seam area based on the standardized point cloud density using a k-means clustering algorithm.

5. The method of claim 4, wherein in step (21), based on the calculated point cloud density, the point cloud density is standardized to [0, 1]:

$$d_i' = \frac{d_i}{d_{max} - d_{min}}, \quad (2)$$

wherein $d_{max}$ is a maximum density of a point in the point cloud P, and $d_{min}$ is a minimum density of a point in the point cloud P.

6. The method of claim 1, wherein the step (3) comprises:

31) selecting a point p from the point cloud $P^s$ of the seam area; constructing a bounding sphere with the point p as a center and R as a radius; in the bounding sphere, taking a point cloud $P_R^S$ of the seam area and a point cloud $P_R^{NS}$ of the non-seam area in the bounding sphere together to constitute a R-neighborhood point cloud of the point p; dividing the point cloud $P_R^S$ in the R-neighborhood seam area and the point cloud $P_R^{NS}$ in the R-neighborhood non-seam area into two parts respectively by Euclidean clustering, so as to obtain $P_{IR}^S$, $P_{oR}^S$, $P_{IR}^{NS}$, $P_{oR}^{NS}$;

32) calculating normal vectors of each point in the point cloud $P_{IR}^{NS}$ in the R-neighborhood non-seam area at the same side of the point p, so as to form a normal vector set $\vec{N}$; taking an average of the normal vectors in the point cloud of the R-neighborhood non-seam area at the side of the point as a normal vector of a local surface at the side of the point p:

$$\vec{n}_S = \frac{1}{|\vec{N}|} \sum_{\vec{n}_i \in \vec{N}} \vec{n}_i; \quad (3)$$

33) searching a point $p_j$ in the point cloud $P_{IR}^S$ of the R-neighboring seam area at the same side of the point p that is closest to each point $q_j$ in the point cloud $P_{oR}^S$ of the R-neighboring seam area at the opposite side of the point p; constructing a direction vector $\vec{\tau}_j = q_j - p_j (\vec{\tau}_j \in \vec{T})$ according to each pair of the points; performing Gaussian clustering on all direction vectors $\vec{T}$; and taking an average $$\vec{\tau} = \frac{1}{|\vec{C}|} \Sigma_{\vec{\tau}_k \in \vec{C}} \vec{\tau}_k$$

of direction vectors in a largest cluster C in a Gaussian clustering result as a direction vector that is perpendicular to a local seam direction at the point;

34) based on the normal vector $\vec{n}_s$ of the local surface at the point p and the direction vector $\vec{\tau}_k$, determining a normal vector of a section $\Gamma$ at the point p using a right-hand rule:

$$\vec{n}_c = \vec{n}_s - \vec{\tau}_k \qquad (4); \text{ and}$$

35) projecting the points of the seam area and the non-seam area which are within a certain range from the point p, to the section $\Gamma$ on the section, and extracting projected points $Q^s$ of the seam area and projected points $Q^{NS}$ of the non-seam area, respectively:

$$q' = p + \vec{pq} \times \vec{n}_c \qquad (5),$$

wherein q is a point to be projected, and q' is a point where the q is projected onto the section $\Gamma$.

7. The method of claim 1, wherein the calculating intersections of the fitting straight line and the fitting circle as a critical point in step (43) comprises:

if there are two intersections $I_1$, $I_2$, taking the intersection closest to a point in the fitting circle as the critical point $p^c = \mathrm{argmin}\{d_1(c_i), d_2(c_i)\}$, wherein $d_1(i) = |c_i - I_1|$, $d_1(i) = |c_i - I_2|$, $c_i \in C_l(C_o)$;

if there is only an intersection I, taking the intersection as the critical point $p^c = I$; and if there is no intersection, taking a point in the fitting circle that is closest to the fitting straight line as the critical point: $p^c = \mathrm{argmax}\, d_L(c_i)$, wherein $d_L(c_i) = |\overrightarrow{p_{l/o} c_i} \times \vec{\tau}_{l/o}|$, $c_i \in C_l(C_o)$; $p_{l/o}$ and $\vec{\tau}_{l/o}$ are defining parameters of the fitting straight line $L_l(L_o)$ of one side.

* * * * *

UNITED STATES PATENT AND TRADEMARK OFFICE
CERTIFICATE OF CORRECTION

| | | |
|---|---|---|
| PATENT NO. | : 11,532,121 B2 | Page 1 of 1 |
| APPLICATION NO. | : 17/169527 | |
| DATED | : December 20, 2022 | |
| INVENTOR(S) | : Jun Wang et al. | |

It is certified that error appears in the above-identified patent and that said Letters Patent is hereby corrected as shown below:

On the Title Page

Item [30], insert --CN202011102350.0-- with a priority date of --10/15/2020--.

Signed and Sealed this
Fourteenth Day of February, 2023

Katherine Kelly Vidal
*Director of the United States Patent and Trademark Office*